US006523876B1

United States Patent
Durand

(12) United States Patent
(10) Patent No.: US 6,523,876 B1
(45) Date of Patent: Feb. 25, 2003

(54) UNITARY CROSS MEMBER AND BODY MOUNT SUPPORT BRACKET FOR A VEHICLE BODY AND FRAME ASSEMBLY

(75) Inventor: Robert D. Durand, Reading, PA (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/968,674

(22) Filed: Sep. 30, 2001

(51) Int. Cl.$^7$ .............................................. B62D 27/04
(52) U.S. Cl. ..................... 296/35.1; 296/35.3; 296/204; 280/797
(58) Field of Search ................................. 296/204, 205, 296/35.1, 35.3; 280/796, 797, 798, 107

(56) References Cited

U.S. PATENT DOCUMENTS

| | | |
|---|---|---|
| 1,846,567 A | 2/1932 | Murray, Jr. |
| 2,009,963 A | 7/1935 | Matthaei |
| 2,107,382 A | 2/1938 | Maddock |
| 2,113,403 A | 4/1938 | Harmon |
| 2,173,525 A | 9/1939 | Wallace |
| 2,192,560 A | 3/1940 | Riemenschneider |
| 2,228,740 A | 1/1941 | Wagner et al. |
| 2,384,096 A * | 9/1945 | Kishline |
| 3,112,950 A * | 12/1963 | Jaskowiak |
| 5,308,115 A * | 5/1994 | Ruehl et al. ................. 280/785 |
| 5,966,813 A | 10/1999 | Durand |
| 5,981,921 A | 11/1999 | Yablochnikov |
| 6,250,679 B1 * | 6/2001 | Schnell ................... 296/35.1 X |
| 6,361,096 B2 * | 3/2002 | Kim ........................... 296/35.1 |

* cited by examiner

Primary Examiner—Joseph D. Pape
(74) Attorney, Agent, or Firm—MacMillan, Sobanski & Todd, LLC

(57) ABSTRACT

A separate type of body and frame assembly includes a frame portion and a body portion. The frame portion includes a pair of side rails, each of which has a plurality of openings formed therethrough. A plurality of cross members extend between side rails and are secured thereto. Each of the cross members has first and second ends that extend through the openings formed through the side rails. Each of the first and second ends of the cross members is formed integrally and unitarily with the cross member and has a body mount structure, such as an aperture, formed therein or otherwise provided thereon. The ends of the cross members are initially inserted through the openings formed through the side rails. Then, such ends of the cross members are secured to the side rails, such as by electromagnetic pulse welding, to form the frame portion. The body mount apertures cooperate with respective body mounts provided on the body portion to connect the body portion to the frame portion to form the vehicle body and frame assembly.

9 Claims, 3 Drawing Sheets

UNITARY CROSS MEMBER AND BODY MOUNT SUPPORT BRACKET FOR A VEHICLE BODY AND FRAME ASSEMBLY

BACKGROUND OF THE INVENTION

This invention relates in general to body and frame assemblies for vehicles. In particular, this invention relates to a unitary cross member and body mount support bracket for use in the frame portion of a vehicle body and frame assembly for facilitating the connection of the body portion thereto.

Many land vehicles in common use, such as automobiles, vans, and trucks, include a body and frame assembly that is supported upon a plurality of ground-engaging wheels by a resilient suspension system. The structures of known body and frame assemblies can be divided into two general categories, namely, separate and unitized. In a typical separate body and frame assembly, the structural components of the body portion and the frame portion of the vehicle are separate and independent from one another. When assembled, the frame portion of the assembly is resiliently supported upon the vehicle wheels by the suspension system and serves as a platform upon which the body portion of the assembly and other components of the vehicle can be mounted. Separate body and frame assemblies of this general type are found in most older vehicles, but remain in common use today for many relatively large or specialized use modern vehicles, such as large vans, sport utility vehicles, and trucks. In a typical unitized body and frame assembly, the structural components of the body portion and the frame portion are combined into an integral unit that is resiliently supported upon the vehicle wheels by the suspension system. Unitized body and frame assemblies of this general type are found in many relatively small modern vehicles, such as automobiles and minivans.

In a typical separate type of vehicle body and frame assembly, the frame portion has a plurality of body mount support brackets secured thereto to facilitate the connection of the body portion of the vehicular body and frame assembly to the frame portion. To accomplish this, each of the body mount support brackets has an opening formed therethrough. The openings are sized in accordance with respective body mounts provided on the body portion of the vehicular body and frame assembly. In a manner that is well known in the art, the body mounts are received and supported within the openings of the body mount support brackets to connect the body portion to the frame portion to form the vehicular body and frame assembly.

Traditionally, the various components of known vehicle body and frame assemblies have been formed from open channel structural members, i.e., structural members that have a non-continuous cross sectional shape (U-shaped or C-shaped channel members, for example). Such open channel structural members are usually formed from flat metal stock that is bent or otherwise deformed into the desired cross sectional shape. The non-continuous cross sectional shape of such open channel structural members allows ancillary devices, such as body mount support brackets, to be secured thereto in a relatively easy manner. For example, it is well known to form one or more apertures through mating portions of the body mount support bracket and the open channel structural member. The apertures are aligned with one another, and threaded fasteners are inserted therethrough to secure the two pieces together. Nuts or other retaining members can be threaded onto the ends of the threaded fasteners and tightened to secure the body mount support bracket to the open channel structural member. Because of the non-continuous cross sectional shape of the open channel structural member, the ends of the threaded fasteners are easily accessible. Furthermore, because the mating portions of the body mount support bracket and the closed channel structural member are generally flat, the nuts on the ends of the threaded fasteners can be tightened as desired without causing damage to either the body mount support bracket or the open channel structural member.

However, more recently, it has been proposed to form one or more of the various vehicle body and frame components from closed channel structural members, i.e., structural members that have a continuous cross sectional shape (tubular or box-shaped channel members, for example). This cross sectional shape is advantageous because it provides strength and rigidity to the vehicle body and frame component. Also, this cross sectional shape is desirable because it facilitates the use of hydroforming. Hydroforming is a well known process that uses pressurized fluid to deform a hollow member into a desired shape. The hollow member is initially disposed between two movable die sections of a hydroforming apparatus that, when closed together, define a die cavity having a desired final shape for the hollow member. Thereafter, the hollow member is filled with a pressurized fluid, typically a relatively incompressible liquid such as water. The pressure of the fluid is increased to a magnitude where the hollow member is expanded outwardly into conformance with the die cavity. As a result, the hollow member is deformed into the desired final shape for the workpiece.

Unfortunately, it has been found to be somewhat more difficult to secure the above-described ancillary devices, including the body mount support brackets, to such closed channel structural members. This is because access to the end of the threaded fastener located within the interior of the closed channel structural member is relatively difficult, thus making it relatively difficult to thread the nut or other retaining device thereon. To address this, it has been proposed to form aligned apertures through a pair of opposed walls of a closed channel structural member and to have the threaded fastener extend through such aligned apertures. Because the end of the threaded fastener extends completely through the closed channel structural member, it is easily accessible to thread the nut or other retaining device thereon. However, care must be taken to prevent the nut from being excessively tightened, which could cause collapsing deformation or other damage to the closed channel structural member. To prevent this from occurring, it has further been proposed to provide a hollow cylindrical spacer about the portion of the threaded fastener that is disposed within the closed channel structural member. Because access to the interior of the closed channel structure member is limited, as mentioned above, the use of such spacers is also relatively difficult. Thus, it would be desirable to provide an improved structure for a body mount support bracket for use in a separate type of a vehicle body and frame assembly.

SUMMARY OF THE INVENTION

This invention relates to an improved structure for a separate type of body and frame assembly including a frame portion and a body portion. The frame portion includes a pair of longitudinally extending side rails, each of which has a plurality of openings formed therethrough. A plurality of transverse cross members extend between side rails and are secured thereto. Each of the cross members is formed having first and second ends that extend through the openings formed through the side rails. Each of the first and second ends of the cross members is formed integrally and unitarily with the cross member and has a body mount structure, such as an aperture, formed therein or otherwise provided thereon. The ends of the cross members are initially inserted through the openings formed through the side rails. Then, such ends of the cross members are secured to the side rails, such as by electromagnetic pulse welding, to form the frame portion of the vehicle body and frame assembly. The body mount apertures cooperate with respective body mounts provided on the body portion to connect the body portion to the frame portion to form the vehicle body and frame assembly.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
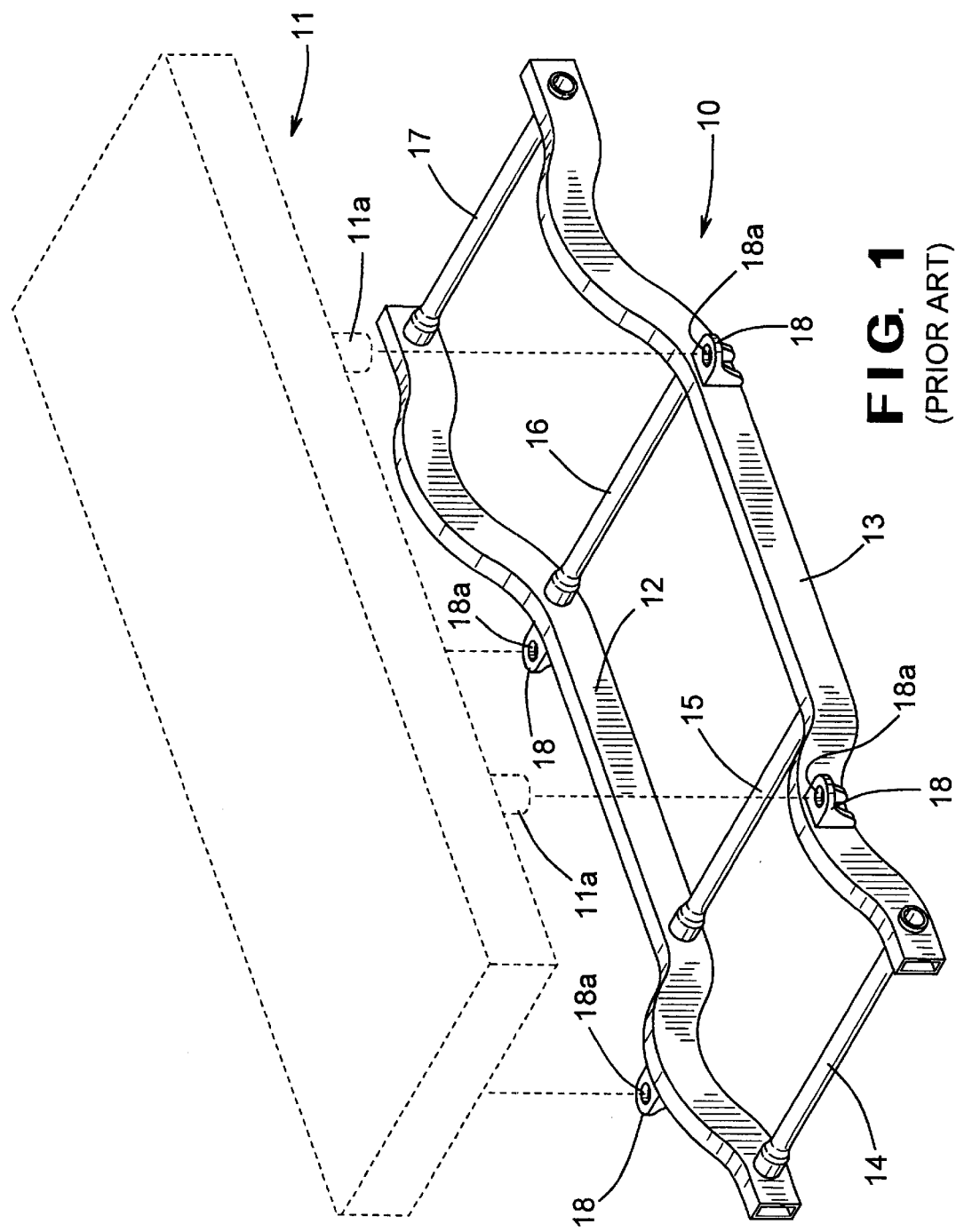
FIG. 1 is a perspective view of a portion of a prior art vehicular body and frame assembly.

Referring now to the drawings, there is illustrated in FIG. 1 a portion of a vehicular body and frame assembly that is conventional in the art. The illustrated vehicular body and frame assembly is a separate type of body and frame assembly, including a frame portion, indicated generally at 10, and a body portion, indicated generally at 11. The illustrated frame portion 10 of the vehicular body and frame assembly is a ladder type frame portion, including a pair of longitudinally extending side rails 12 and 13 having a plurality of transverse cross members 14, 15, 16, and 17 extending therebetween. The side rails 12 and 13 extend longitudinally throughout the entire length of the frame portion 10 and are generally parallel to one another. Each of the side rails 12 and 13 in the illustrated embodiment is formed from a single closed channel structural member having an upper wall, a lower wall, and a pair of side walls. However, it is known that one or both of the side rails 12 and 13 may be formed from a plurality of individually formed closed channel structural members that are secured together by any conventional means, such as by welding, riveting, bolting, and the like. Furthermore, it is known that portions of the side rails 12 and 13 may be formed from open channel structural members.

The cross members 14 through 17 extend generally perpendicular to the side rails 12 and 13 and may be formed having any conventional structure. The cross members 14 through 17 are spaced apart from one another along the length of the frame portion 13 and can be secured to the side rails 12 and 13 by any conventional means, such as by welding, riveting, bolting, and the like. When secured to the side rails 12 and 13, the cross members 14 through 17 provide lateral and torsional rigidity to the frame portion assembly 10 of the vehicular body and frame assembly.

A plurality of body mount support brackets 18 are provided on the vehicle frame assembly 10. The illustrated body mount support brackets 18 are stamped members that are secured to the side rails 12 and 13 of the vehicular body and frame assembly 10 by any conventional means, such as by welding, adhesives, and the like. The body mount support brackets 18 are provided to facilitate the connection of the body portion 11 and other various components (not shown) of the vehicle to the vehicular body and frame assembly 10. To accomplish this, each of the body mount brackets 18 has an opening 18a formed therethrough. The openings 18a are sized in accordance with respective body mounts 11a provided on the body portion 11 of the vehicular body and frame assembly 10. In a manner that is well known in the art, the body mounts 11a are received and supported within the openings 18a of the body mount support brackets 18 to connect the body portion 11 to the frame portion 10.

Figure 2:
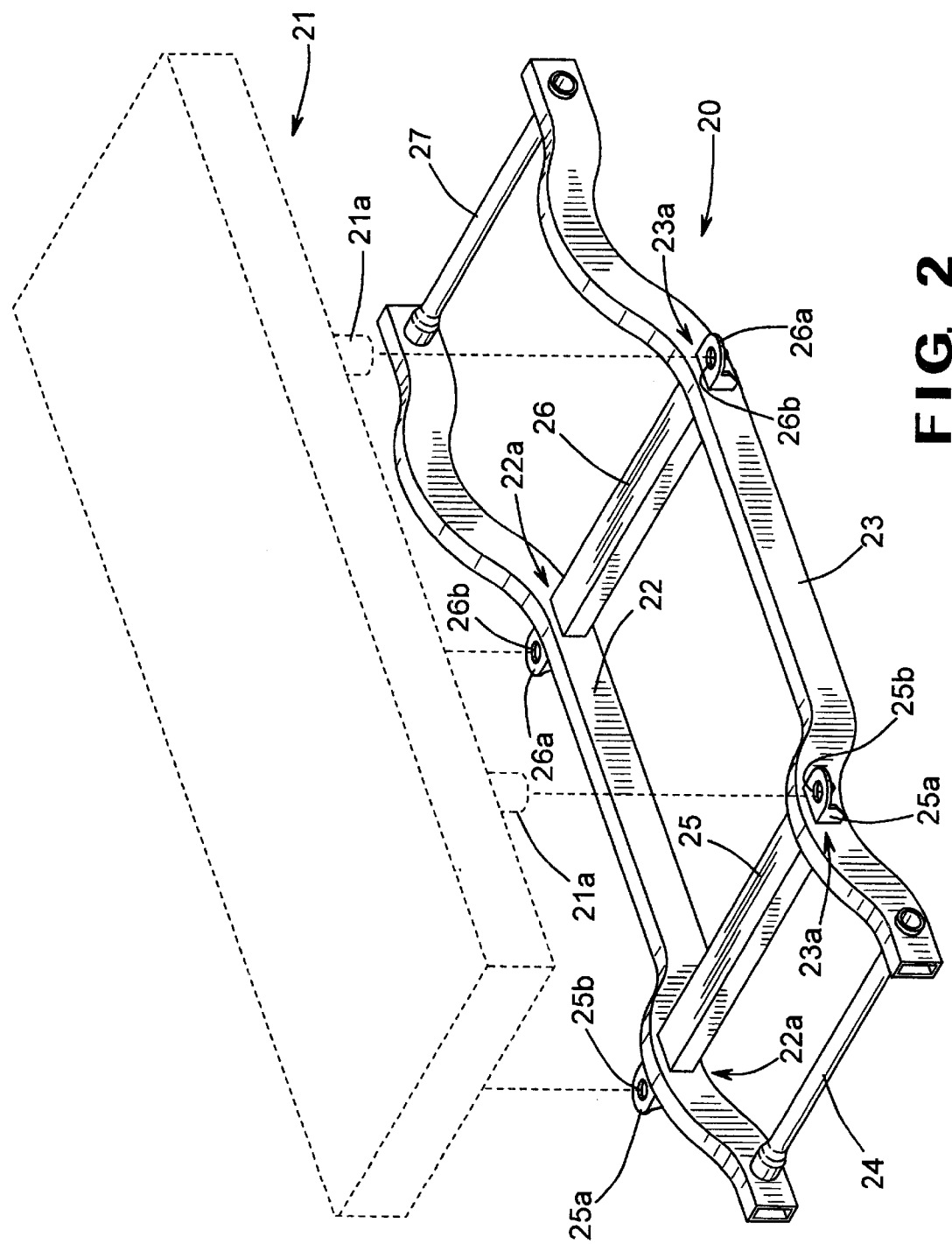
FIG. 2 is a perspective view of a portion of a vehicular body and frame assembly including a unitary cross member and body mount support bracket in accordance with this invention.

Referring now to FIG. 2, there is illustrated a portion of a vehicular body and frame assembly in accordance with this invention. The illustrated vehicular body and frame assembly is a separate type of body and frame assembly, including a frame portion, indicated generally at 20, and a body portion, indicated generally at 21. The illustrated frame portion 20 of the vehicular body and frame assembly is a ladder type frame portion, including a pair of longitudinally extending side rails 22 and 23. The side rails 22 and 23 extend longitudinally throughout the entire length of the frame portion 20 and are generally parallel to one another. Each of the side rails 22 and 23 in the illustrated embodiment is formed from a single closed channel structural member having an upper wall, a lower wall, and a pair of side walls. However, one or both of the side rails 22 and 23 may be formed from a plurality of individually formed closed channel structural members that are secured together by any conventional means, such as by welding, riveting, bolting, and the like. Furthermore, portions or all of the side rails 22 and 23 may be formed from open channel structural members.

Each of the side rails 22 and 23 has a plurality of openings, indicated generally at 22a and 23a in FIG. 2, formed through the inner and outer walls thereof. One of such openings 23a formed through the side rail 23 is clearly illustrated in FIGS. 3 and 4. As shown therein, the opening 23a is defined by a portion of the outer side wall of the side rail 23 that is deformed inwardly to provide a mounting projection. In the illustrated embodiment, the opening 23a and the mounting projection are both generally rectilinear in shape. However, it will be appreciated that the opening 23a and the mounting projection may be formed having any desired shape. The mounting projection is defined by a first relatively large dimension portion 23b that extends inwardly from the outer side wall of the side rail 23 and a second relatively small dimension portion 23c that extends inwardly from the first relatively large dimension portion 23b. The purpose for the opening 23a and the first and second portions 23b and 23c of the mounting projections will be explained below.

A plurality of transverse cross members 24, 25, 26, and 27 extend between side rails 22 and 23 of the vehicle frame assembly 20. The cross members 24 through 27 extend generally perpendicular to the side rails 22 and 23 and are spaced apart from one another along the length of the frame portion 20. In the illustrated embodiment, each of the cross members 24 through 27 is formed from a closed channel structural member, although such in not required. When secured to the side rails 22 and 23, the cross members 24 through 27 provide lateral and torsional rigidity to the frame portion assembly 20 of the vehicular body and frame assembly. In the illustrated embodiment, two of the cross members 24 and 27 are conventional in the art, each being a generally tubular member having a pair of ends that are secured to the side rails 22 and 23 by any conventional means, such as by welding, riveting, bolting, and the like.

Figure 4:
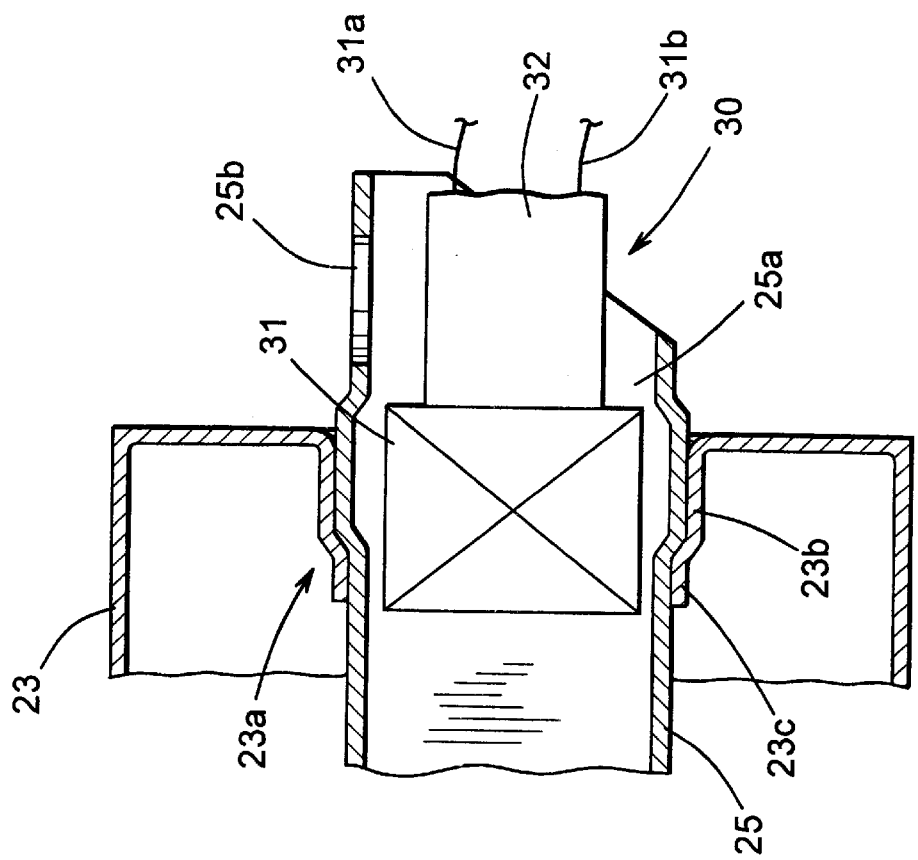
FIG. 4 is a sectional elevational view of the joint illustrated in FIG. 3 at a final stage of assembly.
Figure 3:
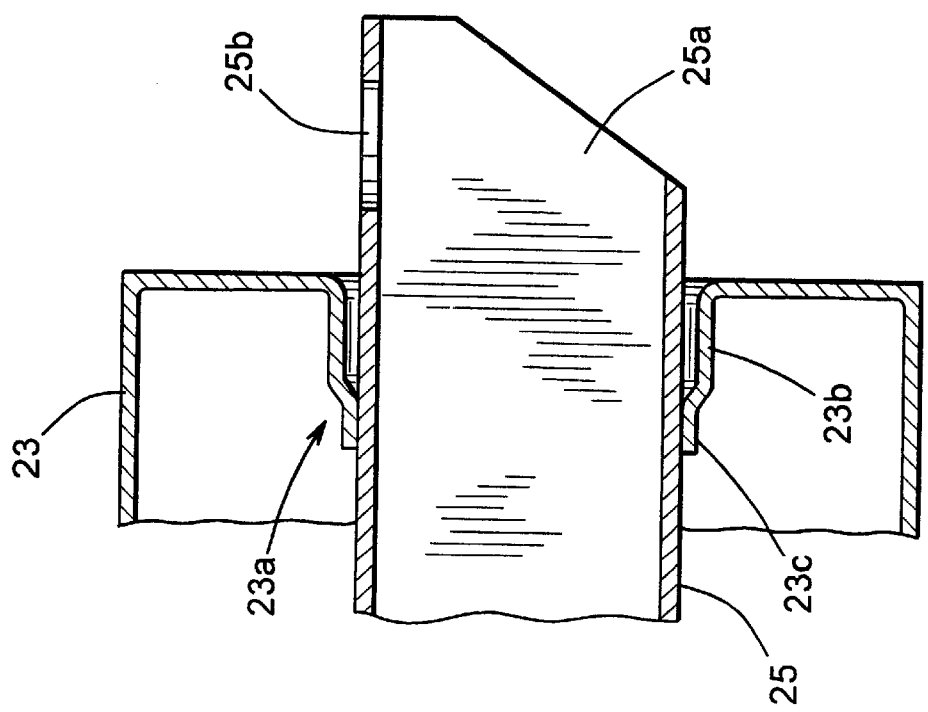
FIG. 3 is a sectional elevational view of a joint between a side rail and the unitary cross member and body mount illustrated in FIG. 2 at an intermediate stage of assembly.

However, the other two of the illustrated cross member 25 and 26 are formed and secured to the side rails 22 and 23 in accordance with this invention. Specifically, the cross member 25 is formed having first and second ends 25a that extend through a first pair of the openings 22a and 23a respectively formed through the side rails 22 and 23. As best shown in FIGS. 3 and 4, each of the first and second ends 25a of the cross member 25 is formed integrally and unitarily (i.e., from the same piece of material) with the cross member 25 and has a body mount structure, such as an aperture 25b, formed therein or otherwise provided thereon. Similarly, the cross member 26 is formed having first and second ends 26a that extend through a first pair of the openings 22a and 23a respectively formed through the side rails 22 and 23. Each of the first and second ends 26a of the cross member 26 is formed integrally and unitarily (i.e., from the same piece of material) with the cross member 26 and also has a body mount structure, such as an aperture 26b, formed therein or otherwise provided thereon. The purpose for the body mount apertures 25b and 26b will be explained below.

FIGS. 3 and 4 illustrate one manner in which the ends 25a and 26a of the cross members 25 and 26 can be secured to the side rails 22 and 23. As shown in FIG. 3, the end 25a of the cross member 25 is initially inserted through the opening 23a formed through the side rail 23. Preferably, the relatively large dimension portion 23b of the mounting projection is somewhat larger in dimension than the outer dimension of the end 25a of the cross member 25, thus providing a relatively large annular gap therebetween. The relatively small dimension portion 23c of the mounting projection is only slightly larger in dimension than the outer dimension of the end 25a of the cross member 25, thus providing a relatively small annular gap therebetween. This relative sizing can be done to facilitate both the insertion of the end 25a of the cross member 25 through the opening 23a while, at the same time, precisely positioning such end 25a of the cross member 25 relative to the side rail 23. However, as mentioned above, the opening 23a and the mounting projection may be formed having any desired shape.

An internal magnetic pulse welding inductor assembly, indicated generally at 30, is provided to connect the end 25a of the cross member 25 to the mounting projection of the side rail 23. The magnetic pulse welding inductor assembly 30 is generally conventional in the art and includes an electromagnetic coil 31 that is carried at the end of a movable support 32. The coil 31 is composed of a winding of an electrical conductor having leads 31a and 31b that extend therefrom through a switch (not shown) to a source of electrical power (not shown). In a manner that is known in the art, when the switch is closed, a closed electrical circuit is formed through the leads 31a and 31b between the source of electrical power and the coil 31. As a result, electrical current flows through the coil 31, causing an intense electromagnetic field to be generated thereabout.

The presence of this electromagnetic field causes the end 25a of the cross member 25 to expand outwardly at a high velocity into engagement with the mounting projection of the side rail 23. Such high velocity engagement causes some or all of the end 25a of the cross member 25 and the mounting projection to weld or molecularly bond together, as shown in FIG. 3. Other portions of the end 25a of the cross member 25 and the mounting projection may only mechanically interlock or engage one another. Specifically, because of the relatively large size of the annular gap between the first portion of the end 25a of the cross member 25 and the relatively large dimension portion 23b of the mounting projection, the generation of the electromagnetic field causes the first portion of the end 25a of the cross member 25 to be accelerated throughout a relatively large distance to achieve a relatively high velocity. Because it is able to achieve this relatively high velocity, the outer surface of the first portion of the end 25a of the cross member 25 will weld or molecularly bond with the inner surface of the relatively large dimension portion 23b of the mounting projection. However, because of the relatively small annular gap between the second portion of the end 25a of the cross member 25 and the relatively small dimension portion 23c of the mounting projection, the generation of the electromagnetic field causes the second portion of the end 25a of the cross member 25 to be accelerated throughout a relatively small distance to achieve a relatively low velocity. Because it is unable to achieve a relatively high velocity, the outer surface of the second portion of the end 25a of the cross member 25 will only mechanically engage and interlock with the inner surface of the relatively small dimension portion 23c of the mounting projection, but will not weld or molecularly bond therewith. Thus, first portions of the end 25a of the cross member 25 and the mounting projection may be welded or molecularly bonded together, while second portions of the end 25a of the cross member 25 and the mounting projection may only mechanically interlock or engage one another. Regardless, the end 25a of the cross member 25 is secured to the side rail 23. The other end 25a of the cross member 25 may be secured to the other side rail 22 in the same manner. Similarly, the ends 26a of the other cross member 26 may be secured to the side rails 22 and 23 in the same manner to form the frame portion 20 of the vehicle body and frame assembly.

The body mount apertures 25b and 26b on the ends 25a and 26a of the cross members 25 and 26 are provided to facilitate the connection of the body portion 21 and other various components (not shown) of the vehicle to the vehicular body and frame assembly 20. To accomplish this, each of the body mount apertures 25b and 26b are sized in accordance with respective body mounts 21a provided on the body portion 21 of the vehicular body and frame assembly 20. In a manner similar to that described above, the body mounts 21a are received and supported within the body mount apertures 25a and 26a on the ends 25a and 26a of the cross members 25 and 26 to connect the body portion 21 to the frame portion 20 to form the vehicle body and frame assembly.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A vehicular body and frame assembly comprising:
a frame portion including a first side rail having an opening formed therethrough, a second side rail, and a plurality of cross members connected to and extending between said side rails, one of said cross members including an end that extends through said opening formed through said first side rail and has a body mount structure provided thereon, said end of said cross member and said body mount structure being formed from a single piece of material; and a body portion including a body mount that engages said body mount structure to connect said body portion to said frame portion.

2. The vehicular body and frame assembly defined in claim 1 wherein said second side rail has an opening formed therethrough, one of said cross members including an end that extends through said opening formed through said second side rail and has a second body mount structure provided thereon, and said body portion includes a second body mount that engages said second body mount structure.

3. The vehicular body and frame assembly defined in claim 1 wherein said first side rail has a plurality of openings formed therethrough, a plurality of said cross members include respective ends that extend through said openings formed through said first side rail and have respective body mount structures provided thereon, and said body portion includes a plurality of body mounts that engage said plurality of body mount structures.

4. The vehicular body and frame assembly defined in claim 1 wherein said first side rail has a plurality of openings formed therethrough, said second side rail has a plurality of openings formed therethrough, a plurality of said cross members include respective ends that extend through said openings formed through said first side rail and said second side rail and have respective body mount structures provided thereon, and said body portion includes a plurality of body mounts that engage said body mount structures.

5. The vehicular body and frame assembly defined in claim 1 wherein said first side rail is formed from a closed channel structural member.

6. The vehicular body and frame assembly defined in claim 1 wherein said first and second side rails are formed from closed channel structural members.

7. The vehicular body and frame assembly defined in claim 1 wherein said one of said cross members is formed from a closed channel structural member.

8. The vehicular body and frame assembly defined in claim 1 wherein each of said cross members is formed from a closed channel structural member.

9. The vehicular body and frame assembly defined in claim 1 wherein said is body mount structure is an aperture formed through said end of said cross member.

* * * * *